US012607744B2

(12) United States Patent
Nakamura et al.

(10) Patent No.: US 12,607,744 B2
(45) Date of Patent: Apr. 21, 2026

(54) DISTANCE MEASUREMENT DEVICE

(71) Applicant: HAMAMATSU PHOTONICS K.K., Hamamatsu (JP)

(72) Inventors: Tomonori Nakamura, Hamamatsu (JP); Kenichiro Ikemura, Hamamatsu (JP); Koji Takahashi, Hamamatsu (JP); Yasunori Igasaki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 717 days.

(21) Appl. No.: 18/104,326

(22) Filed: Feb. 1, 2023

(65) Prior Publication Data

US 2023/0324550 A1 Oct. 12, 2023

(30) Foreign Application Priority Data

Apr. 7, 2022 (JP) ................................. 2022-064012

(51) Int. Cl.
*G01S 17/32* (2020.01)
*G01S 7/48* (2006.01)
*G01S 7/481* (2006.01)

(52) U.S. Cl.
CPC ............ *G01S 17/32* (2013.01); *G01S 7/4808* (2013.01); *G01S 7/4811* (2013.01)

(58) Field of Classification Search
USPC ........................................................ 356/4.01
See application file for complete search history.

(56) References Cited

U.S. PATENT DOCUMENTS

2010/0289692 A1* 11/2010 Winkler ................ G01S 13/584
342/112
2019/0331797 A1* 10/2019 Singer ..................... G01S 17/58
(Continued)

FOREIGN PATENT DOCUMENTS

CN 111190189 A 5/2020
CN 112868145 A 5/2021
(Continued)

OTHER PUBLICATIONS

Cong MA et al, "Microwave Photonic Imaging Radar With a Sub-Centimeter-Level Resolution", Journal of Lightwave Technology vol. 38, No. 18 http://doi.org/10.1109/JLT.2020.3000488, Sep. 5, 2020, p. 4948-p. 4954.

*Primary Examiner* — Yuqing Xiao
*Assistant Examiner* — Clint Thatcher
(74) *Attorney, Agent, or Firm* — Faegre Drinker Biddle & Reath LLP

(57) ABSTRACT

A device includes a signal generation unit that generates a first signal having a first repetition frequency and a second signal having a second repetition frequency higher than the first repetition frequency, a light source unit that generates light whose wavelength is modulated with time through internal modulation based on the first signal, a modulation unit that further modulates, with time, the wavelength of the light using a Doppler effect through external modulation based on the second signal, a splitting unit that divides the light output from the modulation unit into measurement light and reference light, an irradiation unit that irradiates a target object with the measurement light, a detection unit that detects interference light between reflected light from the target object and the reference light, and a calculation unit that calculates a distance to the target object on the basis of an output signal from the detection unit.

7 Claims, 7 Drawing Sheets

(56) References Cited

U.S. PATENT DOCUMENTS

| | | | |
|---|---|---|---|
| 2019/0391243 A1* | 12/2019 | Nicolaescu | ............. G01S 17/42 |
| 2020/0209358 A1* | 7/2020 | Maleki | .................... G01S 17/93 |
| 2021/0255293 A1* | 8/2021 | Kryvobok | ............. G01S 7/4815 |
| 2022/0171059 A1* | 6/2022 | Salsbury | ................. G01S 7/484 |

FOREIGN PATENT DOCUMENTS

| | | | |
|---|---|---|---|
| JP | 2016-525209 A | 8/2016 | |
| JP | 2018-179914 A | 11/2018 | |
| WO | 2014/206630 A1 | 12/2014 | |
| WO | WO-2019/116980 A1 | 6/2019 | |

* cited by examiner

DISTANCE MEASUREMENT DEVICE

TECHNICAL FIELD

The present disclosure relates to a distance measurement device.

BACKGROUND

In the related art, examples of a distance measurement device using light include a distance measurement device described in International Publication No. 2019/116980. This distance measurement device of the related art is a device that performs distance measurement using a plurality of distance measurement signals, and performs quadrature modulation or the like on an optical carrier wave to generate transmission light. The distance measurement device receives reflected light obtained by the transmission light being reflected by a measurement target object, and calculates a distance to the target object on the basis of a plurality of signals obtained by performing orthogonal demodulation or the like on the reflected light.

SUMMARY

As a distance measurement scheme using light, for example, a frequency modulated continuous wave (FMCW) scheme is known. In the FMCW scheme, a target object is irradiated with measurement light modulated so that a frequency of the measurement light is linearly shifted with respect to time, and a Fourier transform is performed on a signal based on interference light between the measurement light and reflected light, such that a distance to the target object or the like can be calculated. In the FMCW scheme, a measurable distance depends on a period of the frequency of measurement light. On the other hand, resolution of the distance to the target object depends on linearity of the frequency of the measurement light. Since this resolution is determined at a constant ratio with respect to a distance determined by a reciprocal of the period of the measurement light, it can be said that there is a trade-off relationship between the measurable distance and the resolution.

The present disclosure has been made to solve the above problem, and an object thereof is to provide a distance measurement device capable of sufficiently ensuring both a range and resolution of a measurable distance.

A distance measurement device according to an aspect of the present disclosure includes a signal generation unit configured to generate a first signal having a first repetition frequency and a second signal having a second repetition frequency higher than the first repetition frequency; a light source unit configured to generate light whose wavelength is modulated with time through internal modulation based on the first signal, and output resultant light; a modulation unit configured to further modulate, with time, the wavelength of the light output from the light source unit using a Doppler effect through external modulation based on the second signal, and output resultant light; a splitting unit configured to divide the light output from the modulation unit into measurement light and reference light; an irradiation unit configured to irradiate a target object with the measurement light; a detection unit configured to detect interference light between reflected light obtained by the measurement light being reflected by the target object and the reference light; and a calculation unit configured to calculate a distance to the target object on the basis of an output signal from the detection unit.

In the distance measurement device, multiple phase modulation is performed on the measurement light with which the target object is irradiated, through long-period internal modulation based on the first signal and short-period external modulation based on the second signal. In the distance measurement device, it is possible to obtain the long period data and the short period data regarding the distance of the target object at the same time by performing a Fourier transform on the output signal from the detection unit. With the distance measurement device, it is possible to sufficiently secure both a range and resolution of a measurable distance by using the long period data suitable for long-distance measurement and the short period data suitable for high resolution.

The signal generation unit may generate the second repetition frequency so that the second repetition frequency becomes an integral multiple of the first repetition frequency. In this case, it is possible to align a phase of the reference light with a phase of the reflected light and achieve simplification of an operation for calculating the distance to the object.

The signal generation unit may synchronize one of the first signal and the second signal with the other. In this case, it is possible to align the phase of the reference light with the phase of the reflected light and achieve the simplification of the operation for calculating the distance to the object.

The signal generation unit may synchronize the first signal with the second signal on the basis of an external trigger signal. In this case, it is possible to align the phase of the reference light with the phase of the reflected light and achieve the simplification of the operation for calculating the distance to the object.

A waveform modulated by the first signal and a waveform modulated by the second signal may have temporal triangular waveforms. This facilitates discrimination between a component of the reference light and a component of the reflected light in the interference light, and simplifies an operation of calculating the distance to the target object.

The light source unit may include a variable optical path length resonator in which an optical path length between resonators changes with time on the basis of the first signal. In this case, it is possible to realize internal modulation in the light source unit with a simple configuration.

The calculation unit may calculate a first difference frequency of the reflected light with respect to the reference light and a second difference frequency of the reference light with respect to the reflected light, and calculate the distance to the target object on the basis of the first difference frequency and a first intensity of the interference light with respect to the first difference frequency, and the second difference frequency and a second intensity of the interference light with respect to the second difference frequency. In this case, a position of the target object can be roughly calculated on the basis of the long period data, and then the position of the target object can be calculated with high resolution on the basis of the short period data.

DETAILED DESCRIPTION

Hereinafter, preferred embodiments of a distance measurement device according to an aspect of the present disclosure will be described in detail with reference to the drawings.

Figure 1:
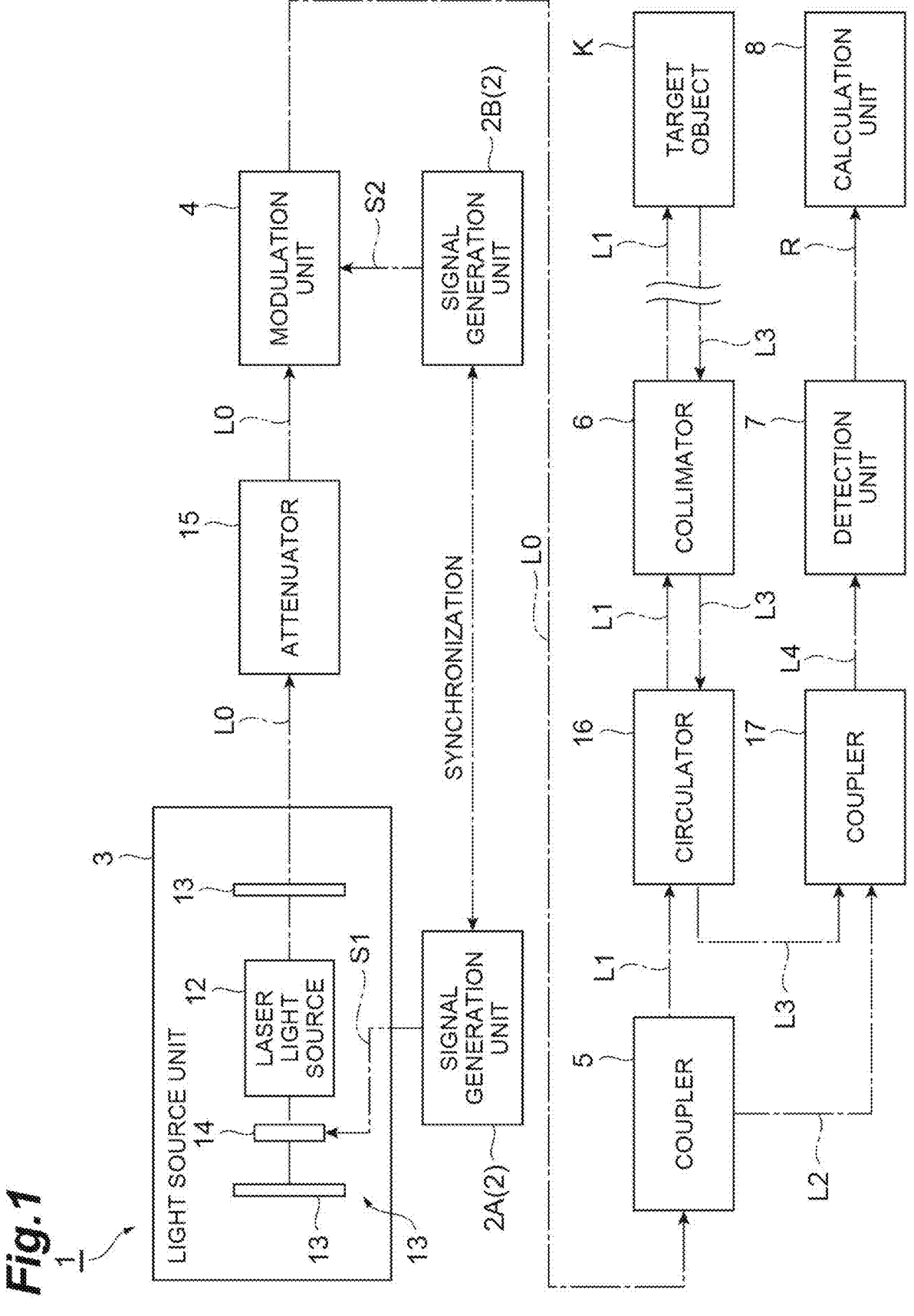
FIG. 1 is a block diagram illustrating a configuration of a distance measurement device according to an embodiment of the present disclosure.

FIG. 1 is a block diagram illustrating a configuration of a distance measurement device according to an embodiment of the present disclosure. The distance measurement device 1 illustrated in FIG. 1 is configured as a device that measures a distance to a target object K on the basis of a frequency modulated continuous wave (FMCW) scheme. The distance measurement device 1 irradiates a target object K with measurement light L1 modulated such that a frequency is linearly shifted with respect to time, and performs a Fourier transform on a signal based on interference light L4 between reference light L2 and reflected light L3 to calculate a distance to the target object K.

As illustrated in FIG. 1, the distance measurement device 1 includes a signal generation unit 2, a light source unit 3, a modulation unit 4, a coupler (splitting unit) 5, a collimator (irradiation unit) 6, a detection unit 7, and a calculation unit 8. Optical components from the light source unit 3 to the detection unit 7 are optically connected by, for example, an optical fiber.

The signal generation unit 2 is a portion that generates a signal used for modulation of the measurement light L1. The signal generation unit 2 is configured of, for example, an analog waveform shaper. In the example of FIG. 1, the signal generation unit 2 includes a first signal generation unit 2A that outputs a signal to the light source unit 3, and a second signal generation unit 2B that outputs a signal to the modulation unit 4. The first signal generation unit 2A and the second signal generation unit 2B are connected to be able to communicate information with each other.

Figures 2A, 2B:
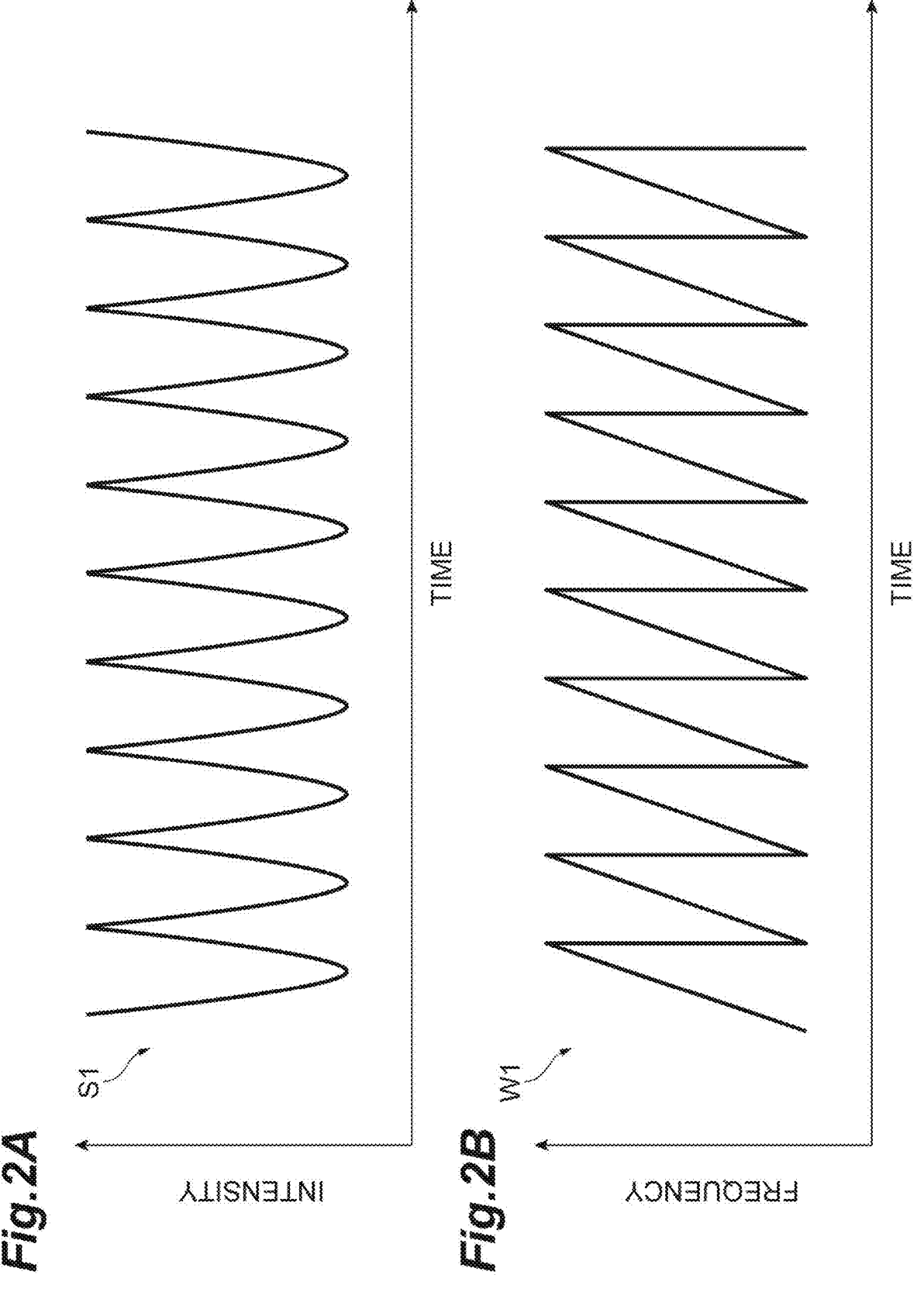
FIG. 2A is a diagram illustrating an example of a waveform of a first signal.
FIG. 2B is a diagram illustrating a waveform modulated by the first signal.

The first signal generation unit 2A generates a first signal S1 having a first repetition frequency F1 and outputs the first signal S1 to the light source unit 3 (see FIG. 2A). The second signal generation unit 2B generates a second signal S2 having a second repetition frequency F2 higher than the first repetition frequency F1, and outputs the second signal S2 to the modulation unit 4 (see FIG. 3A). In the present embodiment, the signal generation unit 2 operates to synchronize one of the first signal S1 generated by the first signal generation unit 2A and the second signal S2 generated by the second signal generation unit 2B with the other.

The light source unit 3 is a portion that generates and outputs a light beam L0 whose wavelength is modulated with time through internal modulation based on the first signal S1. The light source unit 3 includes a laser light source 12 and resonators 13. As the laser light source 12, for example, a stable light source such as a laser diode (LD) may be used. The laser light source 12 generates and outputs continuous light such as continuous wave (CW) light. In the present embodiment, the resonator 13 is a Fabry-Perot type variable optical path length resonator 13A.

The variable optical path length resonator 13A includes a variable optical path length element 14 in the resonators 13 and 13. The variable optical path length element 14 is configured of, for example, an electro-optic crystal such as a KTN crystal. The first signal S1 from the first signal generation unit 2A is input to the variable optical path length element 14. The variable optical path length resonator 13A changes the optical path length between the resonators 13 and 13 with time through the internal modulation based on the first signal S1 input to the variable optical path length element 14 from the first signal generation unit 2A. The light beam L0 output from the light source unit 3 becomes chirped light and is input to the modulation unit 4 via an attenuator 15 or the like.

The modulation unit 4 is a portion that further modulates, with time, a wavelength of the light beam L0 output from the light source unit 3 using a Doppler effect through external modulation based on the second signal S2, and outputs a resultant light beam. The modulation unit 4 is configured of, for example, an electro-optical (EO) phase modulator. The second signal S2 from the second signal generation unit 2B is input to the EO phase modulator. The light beam L0 modulated with time by the modulation unit 4 is input to a coupler 5.

FIG. 2A is a diagram illustrating an example of a waveform of the first signal, and FIG. 2B is a diagram illustrating a waveform modulated by the first signal. The intensity in FIG. 2A has corresponding relations with the optical path length between the resonators 13 and 13 modulated by the variable optical path length resonator 13A. As illustrated in FIG. 2A, in the present embodiment, a signal having a temporal waveform having continuous parabolas with a positive proportionality constant is generated as the first signal S1. Accordingly, a modulated waveform W1 in the light source unit 3 becomes a temporal triangular waveform, as illustrated in FIG. 2B. More specifically, the modulated waveform W1 in the light source unit 3 becomes a sawtooth waveform, and a portion in which the frequency increases linearly with time and a portion in which the frequency instantaneously decreases are formed in each period.

Figures 3A, 3B:
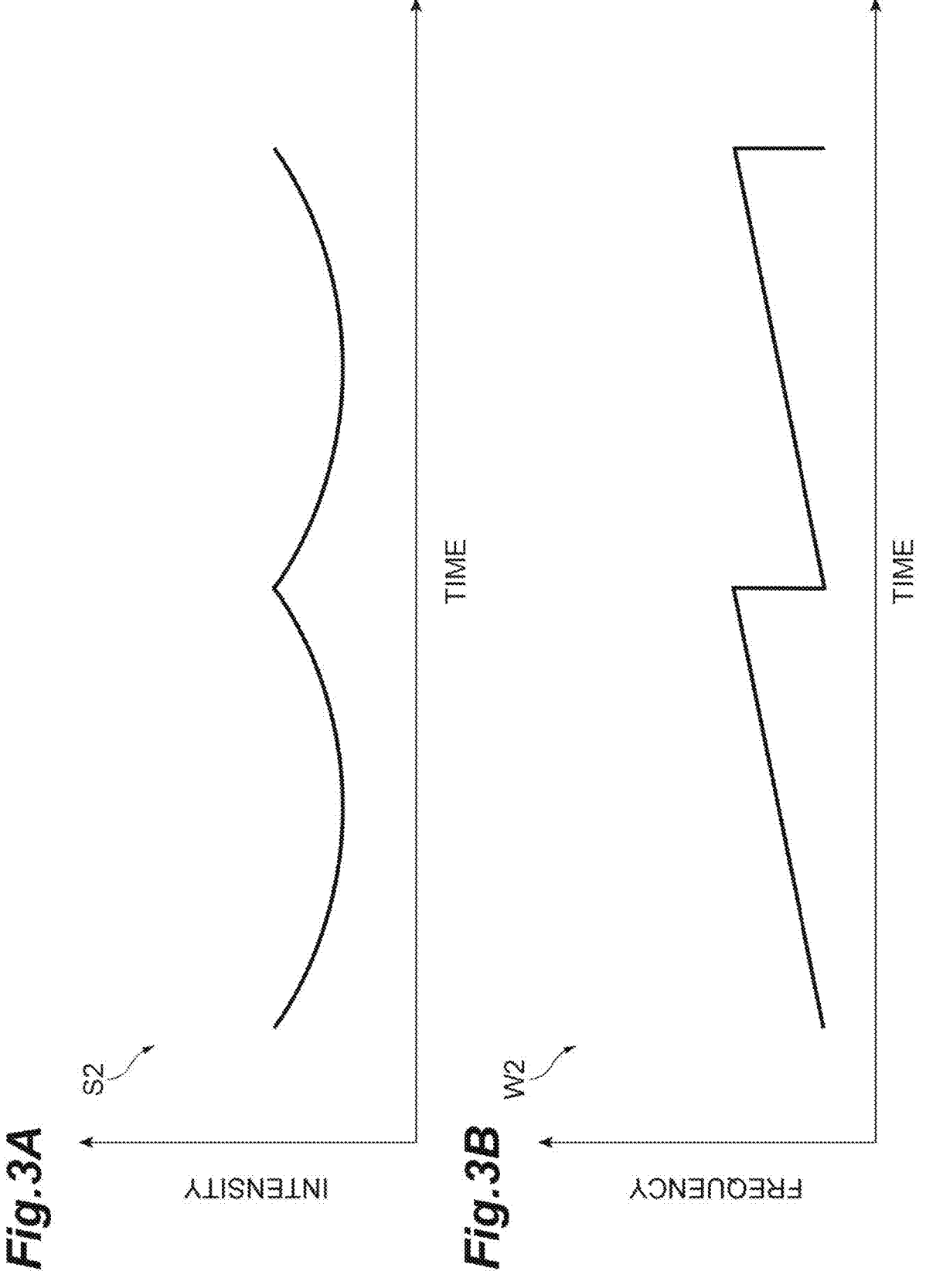
FIG. 3A is a diagram illustrating an example of a waveform of a second signal.
FIG. 3B is a diagram illustrating a waveform modulated by the second signal.

FIG. 3A is a diagram illustrating an example of a waveform of the second signal, and FIG. 3B is a diagram illustrating a waveform modulated by the second signal. As illustrated in FIG. 3A, in the present embodiment, a signal having a temporal waveform having continuous parabolas with a positive proportionality constant is generated as the second signal S2, as in the first signal S1. Accordingly, as illustrated in FIG. 3B, a modulated waveform W2 in the modulation unit 4 becomes a temporal triangular waveform. The modulated waveform W2 in the light source unit 3 becomes a sawtooth waveform, and a portion in which a frequency increases linearly with time and a portion in which the frequency instantaneously decreases are formed in each period, as in the modulated waveform W1 in the light source unit 3.

As described above, the second repetition frequency F2 in the second signal S2 is higher than the first repetition frequency F1 in the first signal S1. Accordingly, a period of the modulated waveform W2 in the modulation unit 4 is shorter than that of the modulated waveform W1 in the light source unit 3. In the example of FIG. 3A, the second repetition frequency F2 in the second signal S2 is an integral multiple of (here, five times) the first repetition frequency F1 in the first signal S1. Therefore, five periods of the modulated waveform W2 in the modulation unit 4 correspond to one period of the modulated waveform W1 in the light source unit 3.

Figure 4:
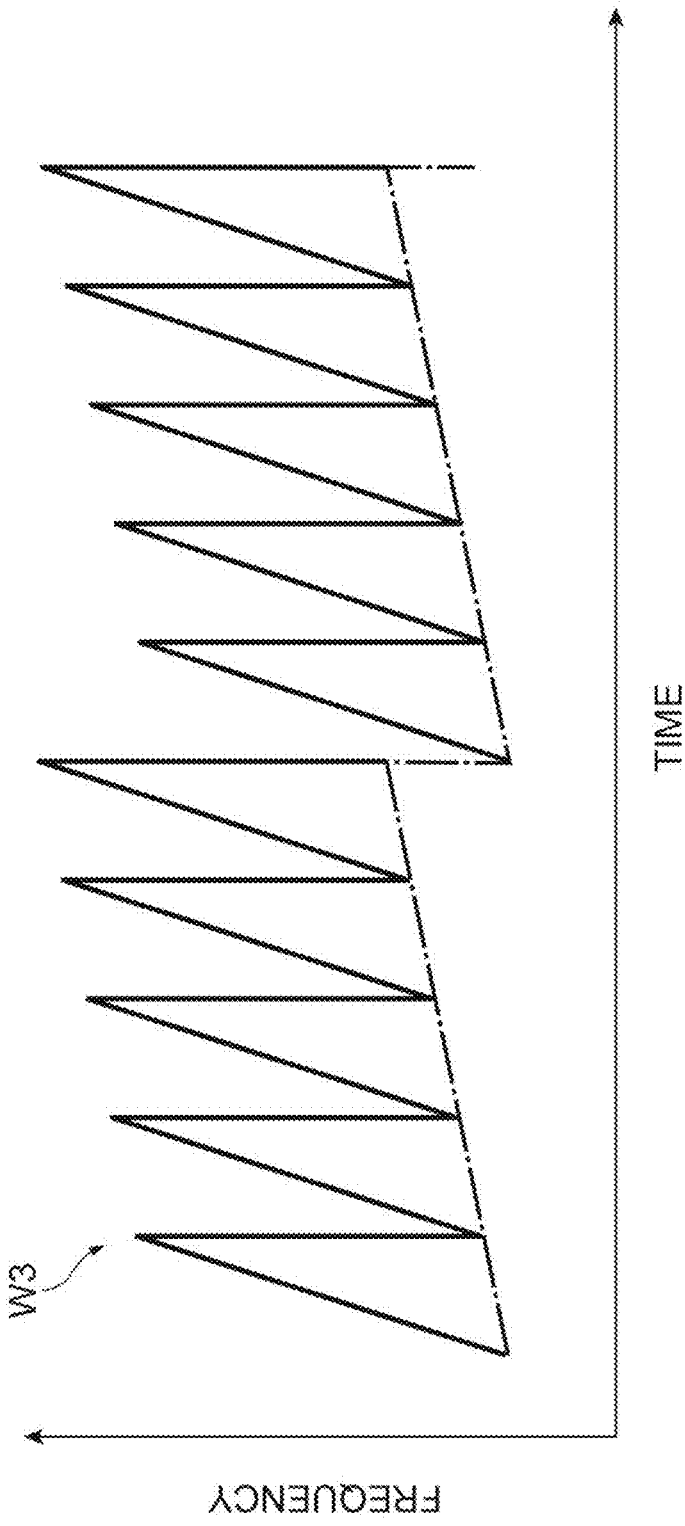
FIG. 4 is a diagram illustrating an example of a waveform of measurement light and reference light.

The coupler 5 is a portion that splits the light beam L0 output from the modulation unit 4 into the measurement light L1 and the reference light L2. The measurement light L1 and the reference light L2 are multiple phase-modulated light in which the internal modulation in the light source unit 3 and the external modulation in the modulation unit 4 are superimposed, as illustrated in FIG. 4. That is, as illustrated in FIG. 4, a temporal waveform W4 of the measurement light L1 and the reference light L2 has a waveform in which the long-period sawtooth waveform illustrated in FIG. 2B is superimposed on the short-period sawtooth waveform illustrated in FIG. 3B.

The measurement light L1 output from the coupler 5 is input to an input port of a three-port type of circulator 16. The measurement light L1 is output from an input and output port of the circulator 16, and the target object K outside the distance measurement device 1 is irradiated with the measurement light L1 via a collimator 6. The reflected light L3 obtained by the measurement light L1 being reflected by the target object K is returned to the distance measurement device 1, and is input to a coupler 17 at a stage after the coupler 5 via an output port from the input and output port of the circulator 16. The reference light L2 output from the coupler 5 is directly input to the coupler 17 at the subsequent stage. In the coupler 17 at the subsequent stage, the interference light L4 is generated by interference between the reflected light L3 and the reference light L2. The interference light L4 is input to the detection unit 7.

The detection unit 7 is a portion that detects the interference light L4 between the reflected light L3 and the reference light L2. The detection unit 7 is configured of, for example, a balance detector. The balance detector is a detector that receives two optical inputs and detects a difference between photocurrents thereof. The detection unit 7 outputs an output signal R indicating a detection result to the calculation unit 8.

The calculation unit 8 calculates the distance to the target object K on the basis of the output signal from the detection unit 7. The calculation unit 8 is physically configured of a computer system including, for example, a processor and a memory. Examples of the computer system may include a personal computer, a microcomputer, a cloud server, and a smart device (a smartphone, a tablet terminal, or the like). The calculation unit 8 may be configured of a programmable logic device (PLD), or may be configured of an integrated circuit such as a field-programmable gate array (FPGA).

Figure 5:
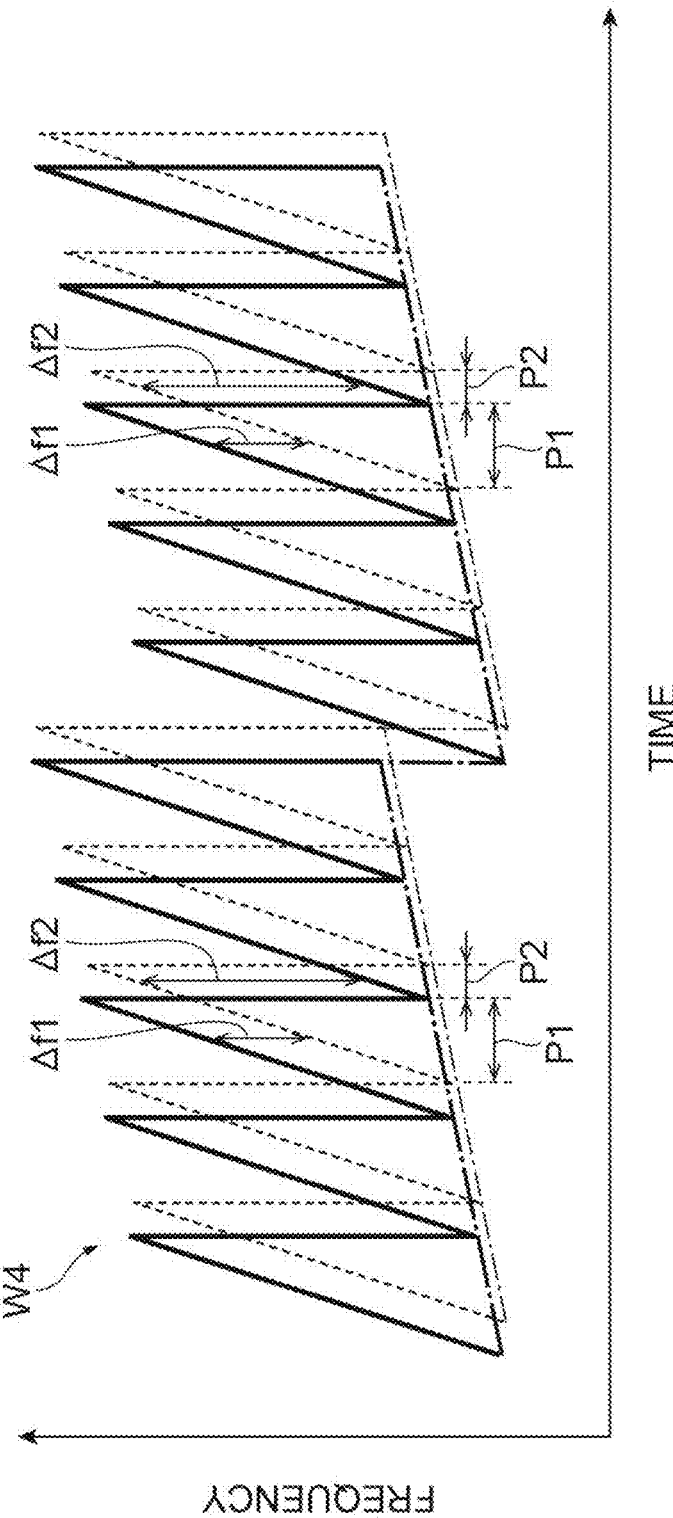
FIG. 5 is a diagram illustrating an example of a waveform of interference light between the reflected light and the reference light.

Hereinafter, an example of calculation of the distance to the target object K in the calculation unit 8 will be shown. FIG. 5 is a diagram illustrating an example of a waveform of the interference light between the reflected light and the reference light. In the temporal waveform W4 of the interference light L4 illustrated in FIG. 5, since the reflected light L3 is light returned by the measurement light L1 being reflected by the target object K, the reflected light L3 is delayed with time with respect to the reference light L2 depending on the distance to the target object K. When the reflected light L3 is delayed with respect to the reference light L2, a frequency difference occurs between the reference light L2 and the reflected light L3.

The calculation unit 8 calculates a first difference frequency $\Delta f1$ of the reflected light L3 with respect to the reference light L2 and a second difference frequency $\Delta f2$ of the reference light L2 with respect to the reflected light L3.

Figure 6:
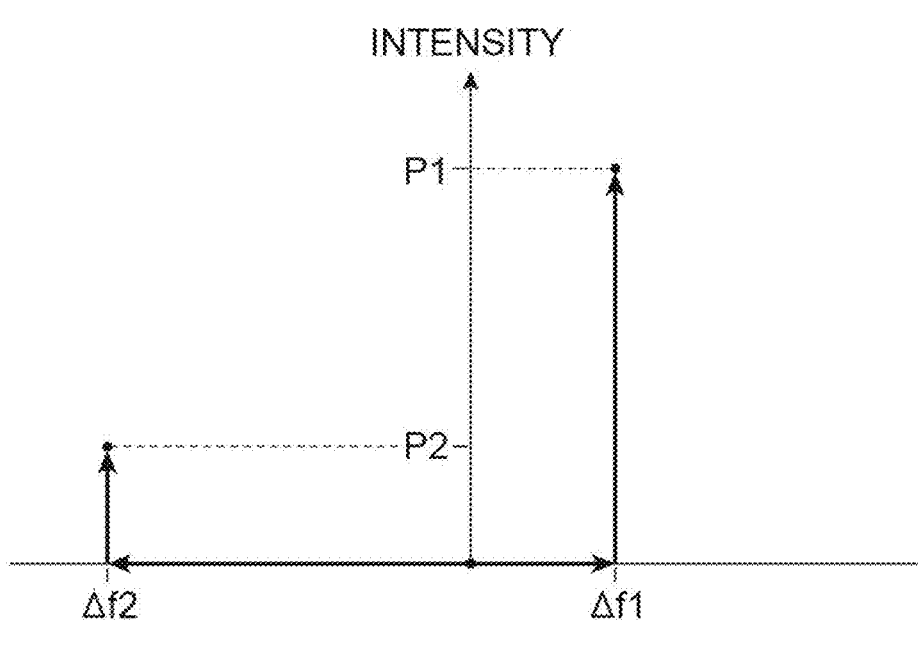
FIG. 6 is a diagram illustrating a relationship between a difference frequency and an intensity of the interference light.

The calculation unit 8 calculates the distance to the target object K on the basis of the first difference frequency $\Delta f1$ and a first intensity P1 of the interference light L4 with respect to the first difference frequency $\Delta f1$, and the second difference frequency $\Delta f2$ and a second intensity P2 of the interference light L4 with respect to the second difference frequency $\Delta f2$. A relationship between the first differential frequency $\Delta f1$ and the first intensity P1 and a relationship between the second differential frequency $\Delta f2$ and the second intensity P2 can be obtained by a Fourier transform of an output signal R of the interference light L4, as illustrated in FIG. 6.

For the distance to the target object K, the calculation unit 8 calculates long period data based on the internal modulation (the modulated waveform W1) in the light source unit 3 and short period data based on the external modulation (the modulated waveform W2) in the modulation unit 4. When a chirp width of the modulated waveform W1 is B1 and the first repetition frequency is F1, a chirp speed of the modulated waveform W1 is expressed as B1×F1. When the distance to the target object K based on the long period data is X1, X1 can be calculated by Equation (1) below. In Equation (1), c is the speed of light.

$$X1 = (c/(2F1)) \times \{(P1 \times \Delta f1 + P2 \times \Delta f2)/(P1+P2)\}/B1 \tag{1}$$

When it is assumed that a chirp width of the modulated waveform W2 is B2 and the second repetition frequency is F2, a chirp speed of the modulated waveform W2 is expressed as B2×F2. When the distance to the target object K based on the short period data is X2, X2 can be calculated by Equation (2) below. In Equation (2), in is an integer of 0 or more.

$$X2 = (c/(2F2)) \times \{\Delta f1 - (P1 \times \Delta f1 + P2 \times \Delta f2)/(P1+P2)\}/B2 + m(c/(2F2)) \tag{2}$$

The integer in in Equation (2) is a parameter for determining how many periods of the modulated waveform W2 correspond to the delay of the reflected light L3 with respect to the reference light L2. The calculation unit 8 first roughly calculates a position of the target object K on the basis of the long period data. A value of in is adjusted so that in is closest to the calculated value, and the position of the target object K is calculated with high resolution on the basis of the short period data.

As described above, in the distance measurement device 1, multiple phase modulation is performed on the measurement light L1 with which the target object K is irradiated, through long-period internal modulation based on the first signal S1 and short-period external modulation based on the second signal S2. In the distance measurement device 1, it is possible to obtain the long period data and the short period data regarding the distance of the target object K at the same time by performing Fourier transform on the output signal R from the detection unit 7. With the distance measurement device 1, it is possible to sufficiently secure both a range and resolution of a measurable distance by using the long period data suitable for long-distance measurement and the short period data suitable for high resolution.

When an attempt to increase a shift amount of the frequency of the measurement light is performed using one phase modulation, it is conceivable that other parameters important for distance measurement, such as a laser line width, are actually affected. Further, there is concern that a waveform of the measurement light is distorted and linearity of frequency shift deteriorate. On the other hand, in the distance measurement device 1, multiple phase modulation is applied to the measurement light L1 as described above, making it possible to sufficiently secure the resolution of the distance to the target object K while suppressing an amount of shift of the measurement light L1

In the distance measurement device 1, the signal generation unit 2 generates the second repetition frequency F2 so that the second repetition frequency F2 is an integral multiple of the first repetition frequency F1. This makes it possible to align a phase of the reference light L2 with a phase of the reflected light L3, and to achieve simplification of an operation for calculating the distance to the target object K. Further, in the distance measurement device 1, the signal generation unit 2 synchronizes one of the first signal S1 and the second signal S2 with the other. This makes it possible to align the phase of the reference light L2 with the phase of the reflected light L3, and achieve simplification of the operation for calculating the distance to the target object K.

In the distance measurement device 1, the modulated waveform W1 by the first signal S1 and the modulated waveform W2 by the second signal S2 have a temporal triangular waveform. Further, in the present embodiment, the modulated waveform W1 by the first signal S1 and the modulated waveform W2 by the second signal S2 have a temporal sawtooth waveform. This facilitates discrimination between a component of the reference light L2 and a component of the reflected light L3 in the interference light L4, and makes it possible to achieve the simplification of the operation for calculating the distance to the target object K.

In the distance measurement device 1, the light source unit 3 includes the variable optical path length resonator 13A in which the optical path length between the resonators 13 and 13 changes with time on the basis of the first signal S1. Accordingly, the internal modulation in the light source unit 3 can be realized with a simple configuration.

In the distance measurement device 1, the calculation unit 8 calculates the first difference frequency Δf1 of the reflected light L3 with respect to the reference light L2 and the second difference frequency Δf2 of the reference light L2 with respect to the reflected light L3. The distance to the target object K is calculated on the basis of the first difference frequency Δf1 and the first intensity P1 of the interference light L4 with respect to the first difference frequency Δf1, and the second difference frequency Δf2 and the second intensity P2 of the interference light L4 with respect to the second difference frequency Δf2. Accordingly, the position of the target object K can be roughly calculated on the basis of the long period data, and then, the position of the target object K can be calculated with high resolution on the basis of the short period data.

The present disclosure is not limited to the above embodiment. For example, in the embodiment, although the signal generation unit 2 synchronizes one of the first signal S1 and the second signal S2 with the other, another scheme may be adopted for the synchronization between the first signal S1 and the second signal S2. For example, the signal generation unit 2 may synchronize the first signal S1 with the second signal S2 on the basis of an external trigger signal. In this case, it is possible to align the phase of the reference light L2 with the phase of the reflected light L3, and achieve simplification of the operation for calculating the distance to the target object K.

Figure 7:
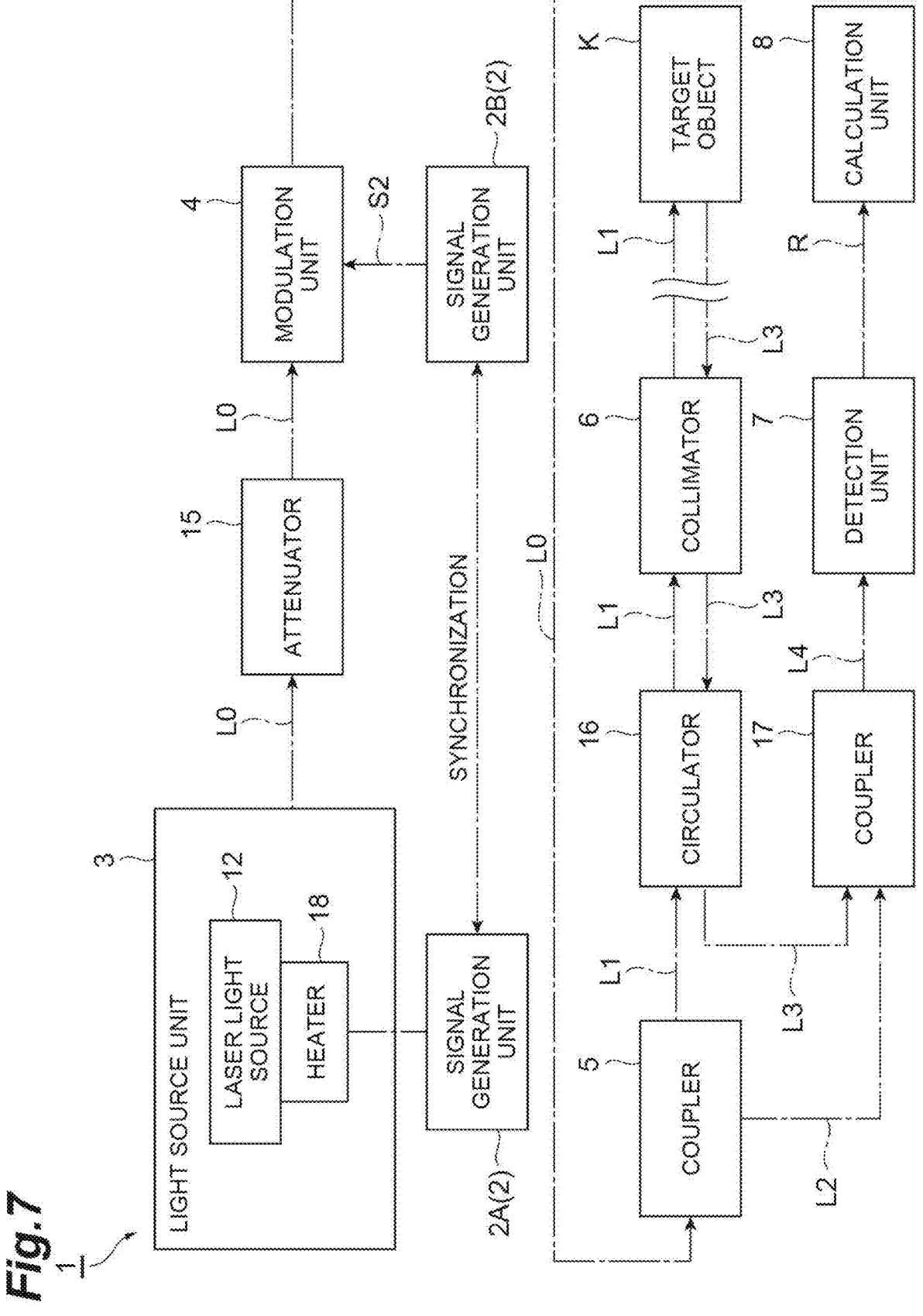
FIG. 7 is a block diagram illustrating a modification example of a light source unit.

Further, in the embodiment, although the variable optical path length resonator 13A is used for the internal modulation in the light source unit 3, a heater 18 may be provided in the laser light source 12 and controlled on the basis of the first signal S1 so that the wavelength of the light beam L0 output from the light source unit 3 is modulated with time, for example, as illustrated in FIG. 7. In such a form, the internal modulation in the light source unit 3 can also be realized with a simple configuration.

What is claimed is:

1. The distance measurement device comprising:
   a signal generator configured to generate a first signal having a first repetition frequency and a second signal having a second repetition frequency higher than the first repetition frequency;
   a light source configured to generate light whose wavelength is modulated with time through internal modulation based on the first signal, and output resultant light;
   a modulator configured to further modulate, with time, the wavelength of the light output from the light source using a Doppler effect through external modulation based on the second signal, and output resultant light;
   a splitter configured to divide the light output from the modulator into measurement light and reference light;
   an irradiator configured to irradiate a target object with the measurement light;
   a detector configured to detect interference light between reflected light obtained by the measurement light being reflected by the target object and the reference light; and
   a calculator configured to calculate a distance to the target object on the basis of an output signal from the detector.

2. The distance measurement device according to claim 1, wherein the signal generator generates the second repetition frequency so that the second repetition frequency becomes an integral multiple of the first repetition frequency.

3. The distance measurement device according to claim 1, wherein the signal generator synchronizes one of the first signal and the second signal with the other.

4. The distance measurement device according to claim 1, wherein the signal generator synchronizes the first signal with the second signal on the basis of an external trigger signal.

5. The distance measurement device according to claim 1, wherein a waveform modulated by the first signal and a waveform modulated by the second signal have temporal triangular waveforms.

6. The distance measurement device according to claim 1, wherein the light source includes a variable optical path length resonator in which an optical path length between resonators changes with time on the basis of the first signal.

7. The distance measurement device according to claim 1, wherein the calculator calculates a first difference frequency of the reflected light with respect to the reference light and a second difference frequency of the reference light with respect to the reflected light, and calculates the distance to the target object on the basis of the first difference frequency and a first intensity of the interference light with respect to the first difference frequency, and the second difference frequency and a second intensity of the interference light with respect to the second difference frequency.

* * * * *